(12) United States Patent
Walter et al.

(10) Patent No.: US 8,894,032 B2
(45) Date of Patent: Nov. 25, 2014

(54) SEAT TRACK MECHANISM

(71) Applicant: Lear Corporation, Southfield, MI (US)

(72) Inventors: Klaus Walter, Paderborn (DE); Michael Wojatzki, Ennigerloch (DE); Christian Ruthmann, Rietberg (DE); Hans-Peter Mischer, Bad Meinberg (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/707,144

(22) Filed: Dec. 6, 2012

(65) Prior Publication Data

US 2013/0193730 A1 Aug. 1, 2013

(30) Foreign Application Priority Data

Jan. 30, 2012 (DE) .......................... 10 2012 201 274

(51) Int. Cl.
*F16M 13/00* (2006.01)
*B60N 2/08* (2006.01)
*B60N 2/07* (2006.01)
*B60N 2/12* (2006.01)

(52) U.S. Cl.
CPC .. *B60N 2/07* (2013.01); *B60N 2/08* (2013.01); *B60N 2/0715* (2013.01); *B60N 2/12* (2013.01); *B60N 2/0705* (2013.01)
USPC ....................................... 248/430; 297/344.1

(58) Field of Classification Search
USPC ........... 248/424, 429, 430; 297/344.1, 344.11
See application file for complete search history.

(56) References Cited

U.S. PATENT DOCUMENTS

| 2,827,948 | A | | 3/1958 | Bertoya |
|---|---|---|---|---|
| 5,813,648 | A | * | 9/1998 | Moradell et al. ............... 248/424 |
| 7,025,319 | B2 | * | 4/2006 | Willems et al. ............... 248/430 |
| 7,971,938 | B2 | | 7/2011 | Wieclawski |
| 8,297,583 | B2 | * | 10/2012 | Kimura et al. ............... 248/430 |
| 2010/0006733 | A1 | * | 1/2010 | Kimura et al. ............... 248/430 |
| 2011/0193389 | A1 | | 8/2011 | Wojatzki et al. |
| 2011/0198906 | A1 | | 8/2011 | Wojatzki et al. |
| 2011/0298265 | A1 | | 12/2011 | Ngiau |
| 2012/0074288 | A1 | * | 3/2012 | Yamada et al. ............... 248/430 |
| 2012/0199719 | A1 | * | 8/2012 | Yamada et al. ............... 248/430 |

FOREIGN PATENT DOCUMENTS

| DE | 4300370 C2 | 7/1993 |
|---|---|---|
| DE | 102004058538 B4 | 6/2006 |
| GB | 775482 A | 5/1957 |
| WO | 2010083607 A1 | 7/2010 |

* cited by examiner

*Primary Examiner* — Steven Marsh
(74) *Attorney, Agent, or Firm* — MacMillan, Sobanski & Todd, LLC

(57) ABSTRACT

A seat track assembly includes first and second tracks. The second track includes a detent. A roller engages the first and second tracks for facilitating movement of the first track relative to the second track. Movement of the first track relative to the second track at a predetermined position causes the roller to engage with the detent such that the detent resists rotation of the roller, thereby temporarily retaining the first track relative to the second track at the predetermined position.

17 Claims, 4 Drawing Sheets

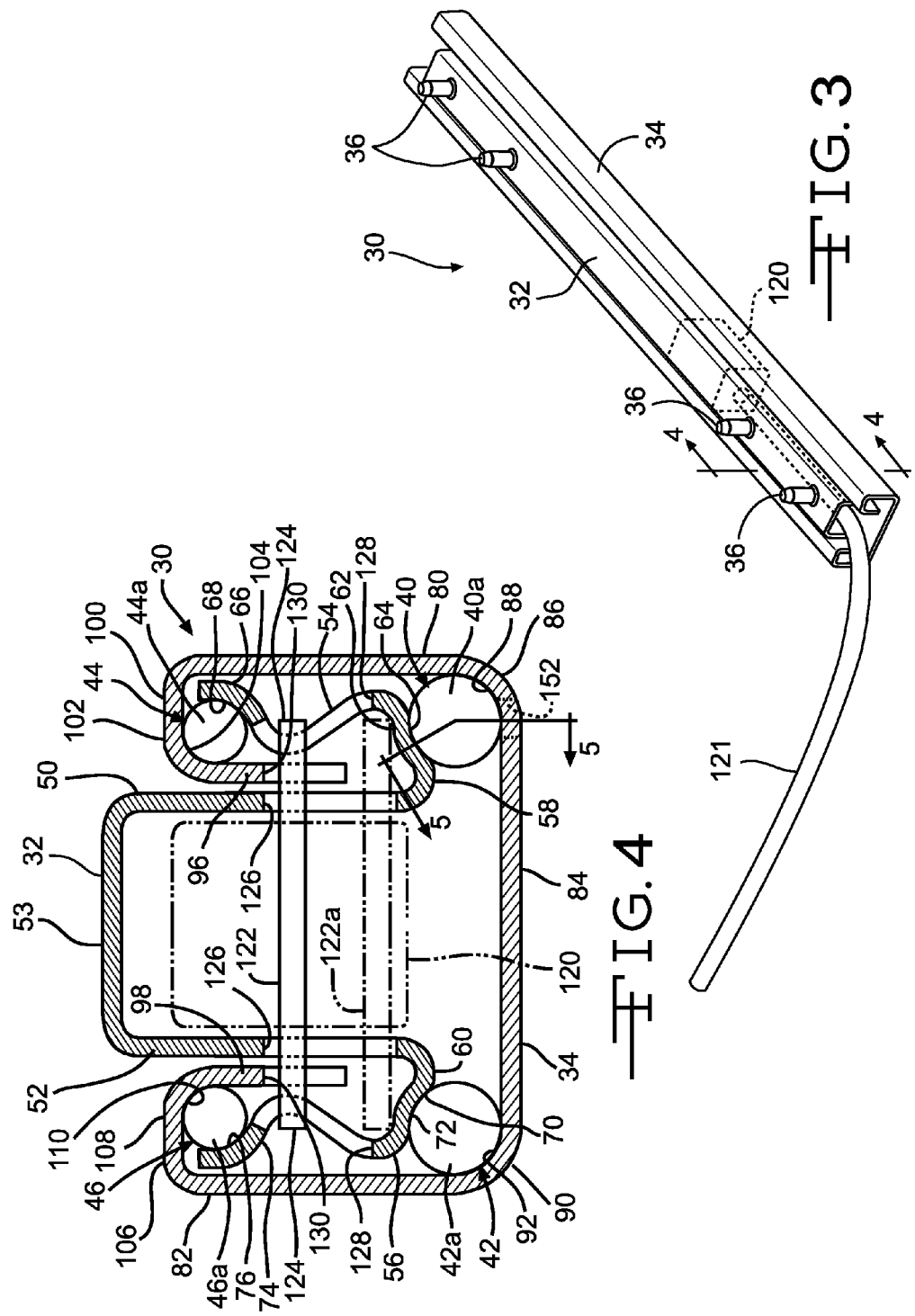

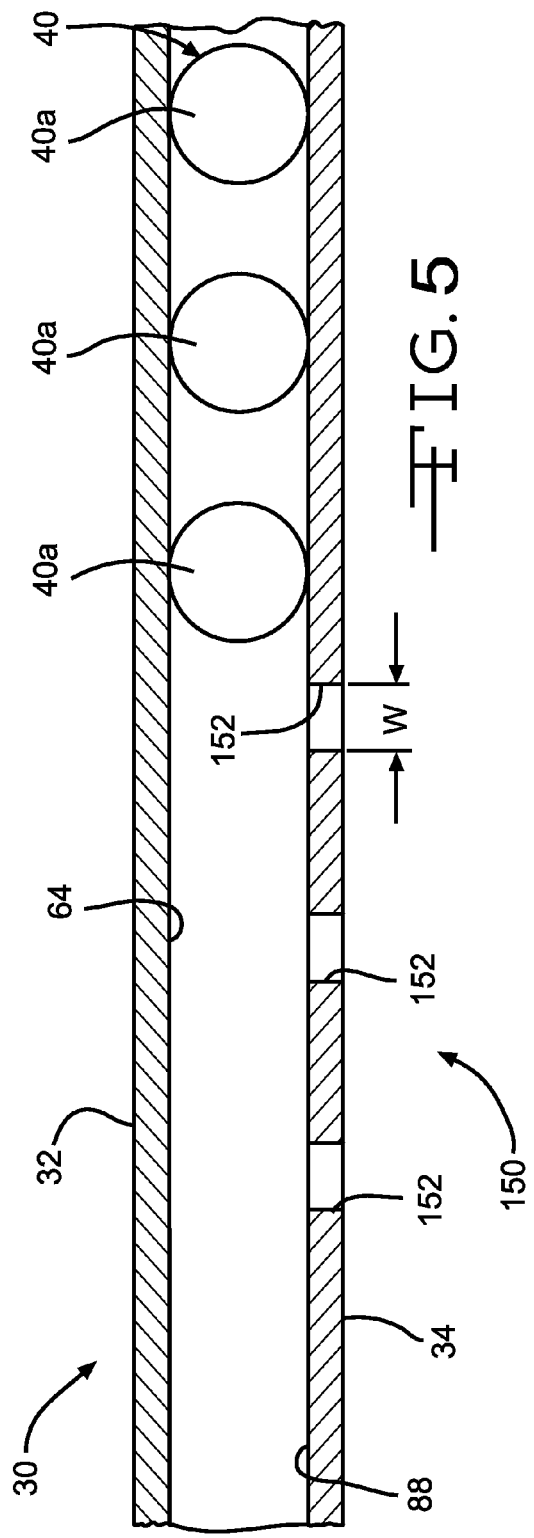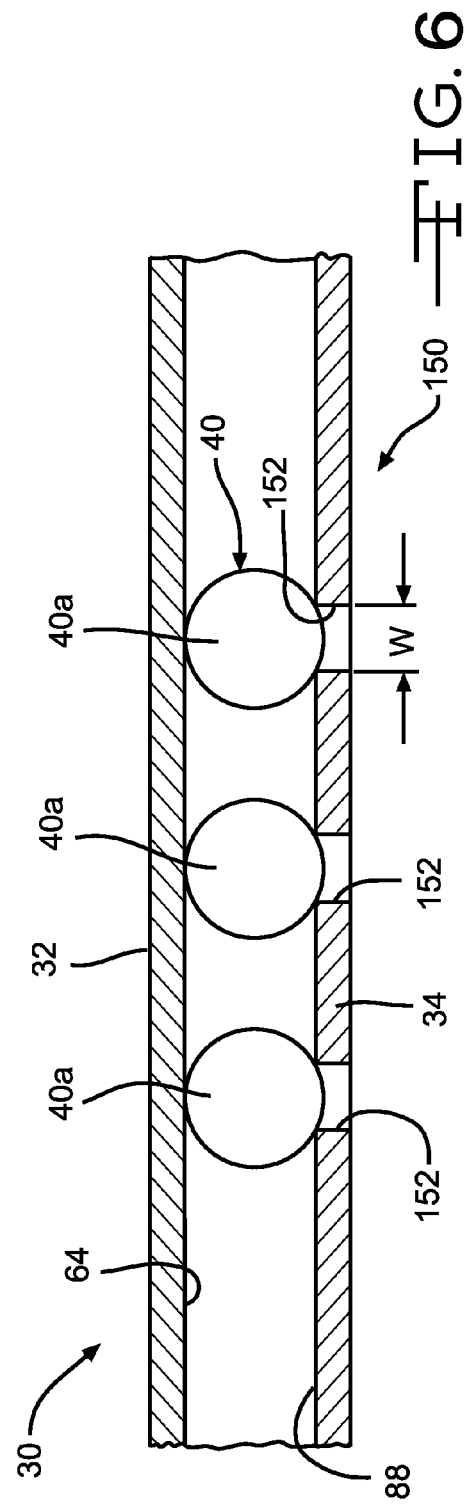

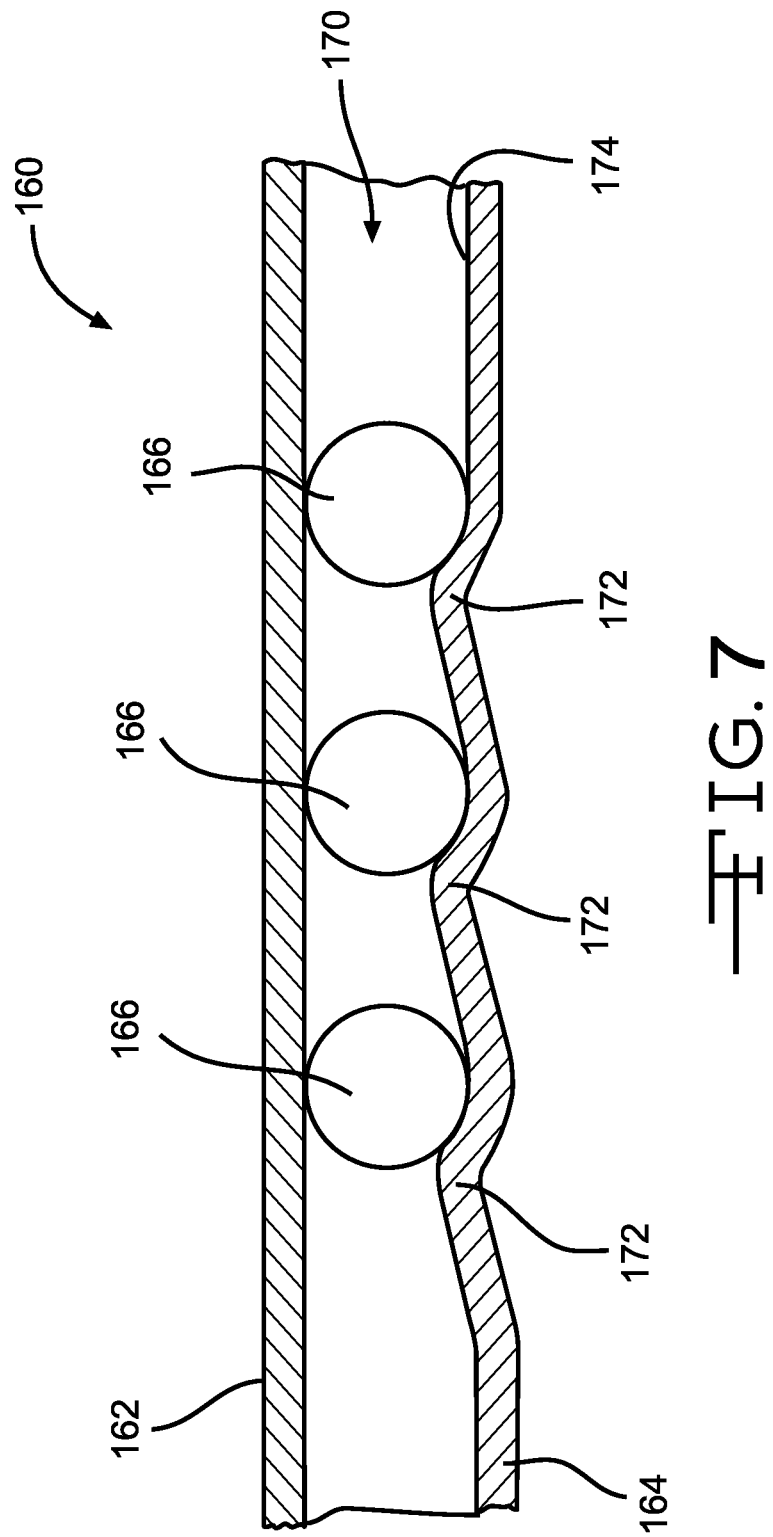

SEAT TRACK MECHANISM

CROSS-REFERENCE TO RELATED APPLICATIONS

This application claims the benefit of German Patent Application No. 102012201274.5 filed Jan. 30, 2012.

BACKGROUND OF THE INVENTION

This invention relates in general to adjustable seats and in particular to vehicle seats whose position may be adjusted fore and aft.

Vehicles, such as passenger cars, typically include seats for the use of a driver and other occupants. In many vehicles, the position of the seats may be adjusted for the comfort of the driver or the occupant. The options to adjust the position of a seat typically include the ability to move the seat fore and aft.

Some vehicles include the option of moving the seats in the first row in order to facilitate access to the second row. This is known as an easy entry option and is commonly seen in two-door vehicles having a front row of seats and a second row of seats located behind the front row. The easy entry option allows the generally upright back portion of the front row seat to be pivoted from its normal use position to a more forward position in order to facilitate access to the space behind the seat. Additionally, the entire seat may be unlocked so that it may be moved forward. Often, the seat is moved to its most forward position. This allows a person to more easily gain access to the space located behind the seat to sit in the second row of seats. After the person is seated in the second row of seats, the seat back of the front row seat may be raised to its normal use position, and the front row seat may be moved rearwardly from its most forward position. Some conventional front row seats include a spring mechanism to bias the front seat in its most forward position when the easy entry feature is used to prevent the front row seat from inadvertently moving rearwardly while the second row passenger is entering or exiting the vehicle.

SUMMARY OF THE INVENTION

This invention relates to vehicle seats and in particular to a vehicle seat having a seat track assembly. The seat track assembly includes first and second tracks. The second track includes a detent. A roller is engaged with the first and second tracks for facilitating movement of the first track relative to the second track. Movement of the first track relative to the second track to a predetermined position causes the roller to engage with the detent such that the detent resists rotation of the roller, thereby temporarily retaining the first track relative to the second track at the predetermined position.

In another aspect of the invention, a seat assembly is provided for mounting on a vehicle floor. The seat assembly includes a seat and a track assembly mounted on the seat for movably mounting the seat relative to the floor. The track assembly permits movement of the seat between an aft seating position and a forward easy entry position. The track assembly may include a first track mounted on the seat and a second track for mounting on the vehicle floor. A detent mechanism temporarily retains the seat in the forward easy entry position such that the seat may be released from the forward easy entry position towards the aft seating position by manually pulling or pushing on said the to overcome a retaining force of said detent mechanism.

Various aspects of this invention will become apparent to those skilled in the art from the following detailed description of the preferred embodiments, when read in light of the accompanying drawings.

BRIEF DESCRIPTION OF THE DRAWINGS

FIG. 3 is a perspective view of the track assembly of FIG. 1.

FIG. 4 is a cross-sectional view along lines 4-4 in FIG. 3 of the track assembly.

FIG. 5 is a sectional view along lines 5-5 in FIG. 4 through a portion of the track assembly incorporating the detent feature.

FIG. 6 is a sectional view of the portion of the track assembly of FIG. 5, wherein the track assembly is shown in a forward easy entry position.

FIG. 7 is a sectional view of a second embodiment of a track assembly incorporating a detent feature, wherein the track assembly is shown in a forward easy entry position.

DETAILED DESCRIPTION OF THE PREFERRED EMBODIMENTS

Figure 1:
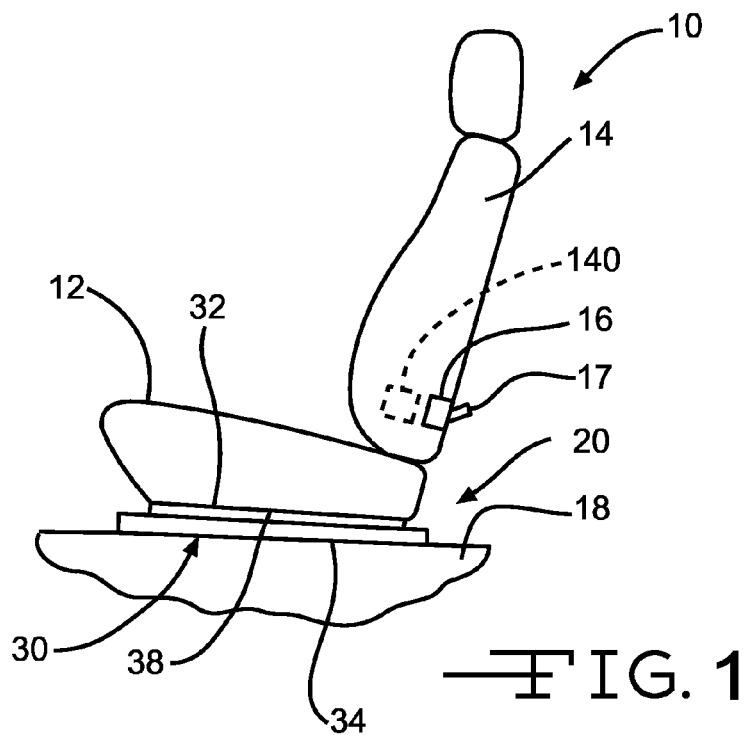
FIG. 1 is a schematic side elevational view of a vehicle seat having a track assembly incorporating an easy entry feature.
Figure 2:
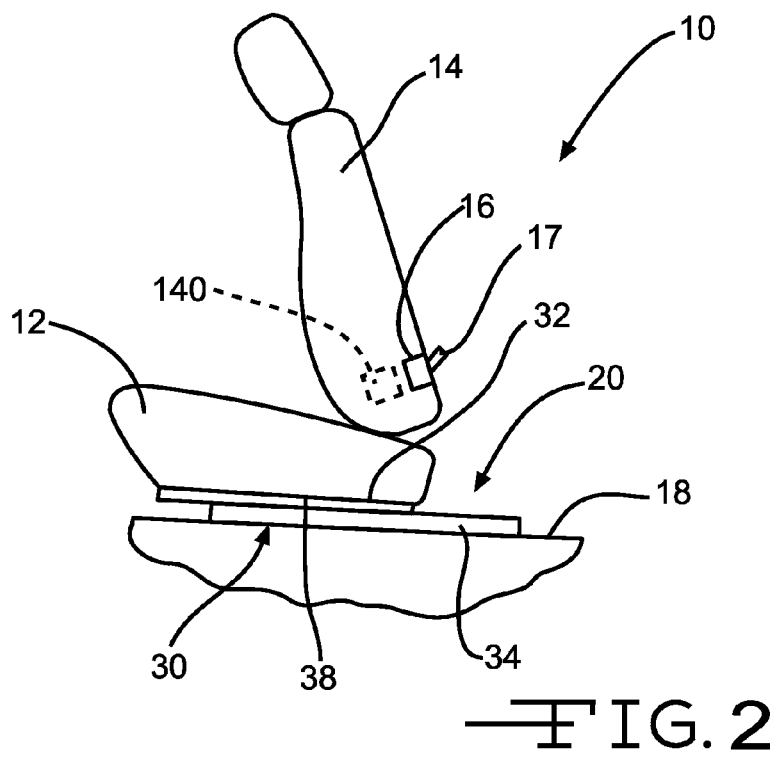
FIG. 2 is a schematic side elevational view of the vehicle seat of FIG. 1, wherein the seat is in its forward easy entry position.

Referring now to the drawings, there is schematically illustrated in FIGS. 1 and 2 a vehicle seat 10. The seat 10 may be in the form of a bucket style seat such that the seat 10 is made for single occupancy, such as a front row driver or passenger seat. However, it should be understood that the seat 10 can be configured other than what is shown and described such as, for example, a bench style seat for supporting multiple occupants. The seat 10 includes a seat bottom 12 and a seat back 14. The seat bottom 12 and seat back 14 may be cushioned and upholstered for aesthetics and for the comfort of the occupants. The seat portion 12 and the backrest 14 may also be upholstered with leather, fabric, or other desired materials.

The seat 10 can include a recliner mechanism (not shown) that permits the seat back 14 to pivot relative to the seat bottom 12 to a desired generally upright normal use position. The recliner mechanism (not shown) can then be operated to a locked position to maintain the seat back 14 at the desired upright position. Thus, the seat back 14 may be moved to one of a plurality of upright normal use positions. As will be discussed below, the seat back 14 may also be pivotally mounted on the seat bottom 12 so that the seat back 14 may be moved from one of the upright normal use positions, as shown in FIG. 1, to a forward easy entry position, as shown in FIG. 2. In the forward easy entry position, the seat back 14 is positioned generally above the seat bottom 12. The reason for moving the seat back 14 to its forward easy entry position will be described in detail below.

The seat 10 may include a latch assembly, indicated schematically at 16 in FIGS. 1 and 2. The latch assembly 16 can be operated to move the seat back 14 between an upright normal use position and the forward easy entry position. For example, the latch assembly 16 may include a lever 17 that is manually operated by the passenger to unlatch the latch assembly 16 so that the seat back 14 can be moved from the upright normal use position to the forward easy entry position. The latch assembly 16 can be integrated with the recliner mechanism (not shown), as described above, or may be separate therefrom.

The seat 10 is supported on a vehicle floor 18 by a seat adjustment apparatus, indicated generally at 20. The seat adjustment apparatus 20 provides support for the seat 10, as well as enabling the seat 10 to be moved to various longitudinal positions in the passenger compartment of the vehicle relative to the vehicle floor 18. For example, the seat adjustment apparatus 20 permits movement of the seat 10 in fore and aft longitudinal directions (leftward and rightward, respectively, as viewing FIGS. 1 and 2). The seat adjustment apparatus 20 may include one or more seat track assemblies, indicated generally at 30. A typically arrangement would include one seat track assembly 30 mounted on an outboard side of the seat 10 and another seat track assembly 30 mounted on an inboard side of the seat 10. In the embodiment shown in FIGS. 1 and 2, only the outboard seat track assembly 30 is shown. The inboard and outboard track assemblies 30 may be similar in structure and function. Therefore, only the structure and function of a single track assembly 30 will be discussed herein.

Referring to FIGS. 3 and 4, the seat track assembly 30 includes an upper track 32 and a lower track 34. The tracks 32 and 34 may be formed from elongated sheets of metal, such as steel, that are formed and/or machined to a desired configuration. Of course, the upper and lower tracks 32 and 34 may be formed from any suitably rigid materials and may be formed as a single structure or multiple components attached together. The upper and lower tracks 32 and 34 are slidably mounted to each other such that the upper track 32 can be moved in a longitudinal direction relative to the lower track 34. For example, in the embodiment of the track assembly 30 shown in FIG. 4, a portion of the upper track 32 is telescopically disposed within the lower track 34. The upper track 32 may be mounted to the seat bottom 12 by any suitable manner. For example, the upper track 32 of the track assembly 30 may include mounting bolts 36 that extend upwardly therefrom for securing the upper track 32 to an underside 38 of the seat bottom 12. The lower track 34 is preferably fixedly mounted to the vehicle floor 18. It should be understood that the terms upper and lower as used herein are for reference only and the track assemblies 30 may be oriented differently than what is shown in FIGS. 1-4. For example, the track assemblies 30 may be arranged in an angled or sideways manner such that the lower track 34 is mounted to a side wall of the vehicle floor 18 instead of a generally horizontal floor 18 shown in FIGS. 1 and 2.

The upper track 32 may be configured to slide relative to the lower track 34 with the assistance of multiple rollers disposed between portions of the tracks 32 and 34. In the embodiment shown in FIGS. 4 through 6, there is a lower outboard row of rollers 40, a lower inboard row of rollers 42, an upper outboard row of rollers 44, and an upper inboard row of rollers 46. Each row of rollers 40, 42, 44, and 46 may have a plurality of rollers arranged and spaced from each other along the longitudinal lengths of the tracks 32 and 34. For example, there are three rollers 40*a* shown in FIGS. 5 and 6 which illustrate a portion of the upper and lower tracks 32 and 34. The row of rollers 42, 44, and 46 may have a plurality of rollers 42*a*, 44*a*, and 46*a*, respectively. The plurality of rollers within the row of rollers 40, 42, 44, and 46 may extend along the entire length of the upper and lower tracks 32 and 34 or may be located only at select portions thereof. For example, it may be sufficient to only include groups of rollers 40*a*, 42*a*, 44*a*, and 46*a* at end portions of the tracks 32 and 34. Although the rollers 40*a*, 42*a*, 44*a*, and 46*a* are shown and described as being spherical in shape, it should be understood that the rollers 40*a*, 42*a*, 44*a*, and 46*a* may have a shape other than spherical, such as cylindrical. Additionally, the rollers 40*a*, 42*a*, 44*a*, and 46*a* may be identically shaped and sized or may be sized differently from one another. For example, as shown in FIG. 4, the rollers 40*a* and 42*a* of the row of rollers 40 and 42 are larger in diameter than the rollers 44*a* and 46*a* of the row of rollers 44 and 46. This arrangement of larger diameter rollers 40*a* and 42*a* accommodates the different loads acting on the rollers 40*a*, 42*a*, 44*a*, and 46*a* due to the specific configuration of the seat track assembly 30.

It may also be desirable to include a cage (not shown) which can be disposed between the upper and lower tracks 32 and 34 and confines the rollers 40*a*, 42*a*, 44*a*, and 46*a* such that they are secured in a spaced relationship with one another, while still being permitted to roll along the lengths of the upper and lower tracks 32 and 34. The cage (not shown) may be in the form of an elongated strip having holes formed therein which loosely hold the rollers 40*a*, 42*a*, 44*a*, and 46*a* in their desired placement. Alternatively, the rollers 40*a*, 42*a*, 44*a*, and 46*a* may be freely disposed between the upper and lower tracks 32 and 34. Thus, the rollers 40*a*, 42*a*, 44*a*, and 46*a* may be permitted to move relative to one another in the longitudinal direction along the upper and lower tracks 32 and 34.

The upper and lower tracks 32 and 34 can have any shape which is suitable to permit the upper track 32 to slide relative to the lower track 34. Thus, the upper and lower tracks 32 and 34 can have any suitable construction which permits a sliding mounting arrangement. In the embodiment illustrated in FIG. 4, the track assembly 30 includes four rows of rollers 40, 42, 44, and 46 which roll along adjacent portions of the upper and lower tracks 32 and 34. To accommodate the rollers 40*a*, 42*a*, 44*a*, and 46*a*, the upper track 32 includes first and second inner walls 50 and 52 connected together by an upper web 53. As shown in FIG. 3, the mounting bolts 36 are secured to the upper web 53 for attachment of the upper track 32 to the seat bottom 12. Referring back to FIG. 4, the upper track 32 further includes first and second outer walls 54 and 56. The upper track 32 includes a first generally laterally extending portion 58 that connects the first inner wall 50 with the first outer wall 54. The upper track 32 also includes a second generally laterally extending portion 60 that connects the second inner wall 52 with the second outer wall 56.

The first extending portion 58 includes a bent portion 62 having an arcuate engagement surface 64. The rollers 40*a* of the row of rollers 40 engage and roll along the engagement surface 64 as the upper track 32 moves relative to the lower track 34. The first outer wall 54 includes an end portion 66 having an arcuate engagement surface 68. The rollers 44*a* of the row of rollers 44 engage and roll along the arcuate engagement surface 68 as the upper track 32 moves relative to the lower track 34. Similarly, the second extending portion 60 includes a bent portion 70 having an arcuate engagement surface 72. The rollers 42*a* of the row of rollers 42 engage and roll along the arcuate engagement surface 72 as the upper track 32 moves relative to the lower track 34. The second outer wall 56 includes an end portion 74 having an arcuate engagement surface 76. The rollers 46*a* of the row of rollers 46 engage and roll along the arcuate engagement surface 76 as the upper track 32 moves relative to the lower track 34.

The lower track 34 includes first and second outer walls 80 and 82 which are connected together by a generally horizontally extending floor portion 84. The floor portion 84 may be fixedly attached to the vehicle floor 18 by any suitable manner, such as by mounting bolts (not shown). The lower track 34 includes a first corner portion 86 connecting the first outer wall 80 with the floor portion 84. The corner portion 86 includes an arcuate engagement surface 88. The rollers 40*a* of the row of rollers 40 engage and roll along the arcuate engagement surface 88 as the upper track 32 moves relative to the lower track 34. The lower track 34 also includes a second corner portion 90 connecting the second outer wall 82 with the floor portion 84. The corner portion 90 includes an arcuate engagement surface 92. The rollers 42a of the row of rollers 42 engage and roll along the arcuate engagement surface 92 as the upper track 32 moves relative to the lower track 34.

The lower track 34 includes first and second inner walls 96 and 98. The first inner wall 96 is connected to the first outer wall 80 via a first web portion 100 having a corner portion 102. The corner portion 102 includes an arcuate engagement surface 104. The rollers 44a of the row of rollers 44 engage and roll along the arcuate engagement surface 104 as the upper track 32 moves relative to the lower track 34. The second inner wall 98 is connected to the second outer wall 82 via a second web portion 106 having a corner portion 108. The corner portion 108 includes an arcuate engagement surface 110. The rollers 46a of the row of rollers 46 engage and roll along the arcuate engagement surface 110 as the upper track 32 moves relative to the lower track 34.

The track assembly 30 may include a lock assembly, indicated schematically at 120 in FIGS. 3 and 4. The lock assembly 120 enables the seat occupant to adjust the fore and aft position of the seat 10 relative the vehicle floor 18 and then retain or lock the seat 10 in a desired position. The lock assembly 120 can be any suitable apparatus which permits the upper and lower tracks 32 and 34 to move relative to one another and then selectively lock the upper and lower tracks 32 and 34 relative to one another once moved to a desired position. In the illustrated embodiment of FIG. 4, the locking assembly 120 includes a catch 122 which is movable between a locked position, as indicated by solid lines 122, and an unlocked position, indicated generally by broken lines 122a. The catch 122 may be moved by any suitable manner. For example, the lock assembly 120 may include a handle 121, as shown in FIG. 3, which extends outwardly from between the upper and lower tracks 32 and 34 such that movement of the handle 121 caused the catch 122 to move between its locked and unlocked positions. The catch 122 includes ends 124 which are moved vertically within slots 126 formed in the inner walls 50 and 52 of the upper track 32. The ends 124 of the catch 122 also extend through slots 128 formed in the outer walls 54 and 56 of the upper track 32. The lock assembly 120 and the catch 122 are mounted on the upper track 32 and thus move with the upper track 32 as the upper track 32 moves relative to the lower track 34. The lower track 34 includes a plurality of slots 130 formed in the inner walls 96 and 98. The plurality of slots 130 extend along the longitudinal length of the lower track 34 and may be equally spaced from one another.

When the catch 122 of the lock assembly 120 is in its locked position, each of the ends 124 of the catch 122 extend through an associated one of the slots 130. The slot 130 may be sized to have the same width or slightly wider than the ends 124 of the catch 122, so that the ends 124 of the catch 122 are trapped within the respective slots 130, thereby preventing movement of the upper track 32 relative to the lower track 34. When the seat occupant wants to adjust the position of the seat 10 relative to the vehicle floor 18, the occupant manipulates the handle 121 to cause the catch 122 to be moved to its unlocked position 122a, as shown in FIG. 4. In the unlocked position, the ends 124 of the catch 122 extend downwardly and out from the slots 130. The upper track 32 can then be moved relative to the lower track 34 to a desired position. The handle 121 is then moved to cause the ends 124 of the catch 122 to move upwardly into different slots 130 of the inner walls 96 and 98 of the lower track 34. The catch 122 can be a single member which moves into a single pair of opposed slots 130 or may include multiple members or ends 124 which simultaneously extend into multiple slots 130 along the length of the lower track 34. As stated above, the lock assembly 120 can be any suitable apparatus other than that illustrated to selectively lock the upper track 32 relative to the lower track 34 in a desired position.

The seat 10 may be configured such that it includes an easy entry feature. An easy entry feature enables the seat 10 to be moved from an upright normal use position, as shown in FIG. 1, to a forward easy entry position, as shown in FIG. 2. In the forward easy entry position, the seat 10 is moved forward in the vehicle and the seat back 14 is pivoted to a forward position above the seat bottom 12. When the seat 10 is in the forward easy entry position, a passenger can more easily enter and exit the rear of the vehicle. For example, if the seat 10 is installed as a front row seat in a two door coupe vehicle, the easy entry feature would permit the seat 10 to be moved forward to expand the room within the passenger compartment so that a passenger could more easily enter through the respective door to get to a second row seat located behind the front row seat 10. Once the passenger is seated in the second row seat, the seat 10 can be moved back to its upright normal use position.

The seat 10 can be operated by any suitable manner to move it between the upright normal use position and the forward easy entry position. For example, as described above, the seat 10 may include a latch assembly 16 for locking and releasing the seat back 14 from its upright normal use position. To initiate the easy entry mode, the lever 17 of the latch assembly 16 is operated, thereby unlatching the seat back 14 from the seat bottom 12. The seat back 14 can then be pivoted to its forward easy entry position above the seat bottom 12. The seat 10 may also be slid forward to a forward easy entry position, as shown in FIG. 2, such that the upper track 32 is moved forward relative to the lower track 34. To permit the sliding movement of the seat 10 relative to the vehicle floor 18, the seat 10 may include an actuator, indicated schematically at 140 in FIGS. 1 and 2, that actuates the lock assembly 120 to release the catch 122 from the slots 130. The actuator 140 may be automatically actuated upon movement of the seat back 14 to its forward easy entry position above the seat bottom 12. Thus, when the seat back 14 is pivoted forward to a sufficient angle relative to the seat bottom 12, the actuator 140 operates the lock assembly 120 to move the catch 122 from out of the slots 130. When the catch 122 is withdrawn from the slots 130, the upper track 32 is free to move relative to the lower track 34. Thus, the seat 10 can then be pushed or pulled to its forward easy entry position, as shown in FIG. 2. The actuator 140 can include any suitable mechanism, such as a cable (not shown), that operates the catch 122 upon the pivoting motion of the seat back 14. After the passenger has entered or exited the second row seat, the seat 10 can be slid rearwardly back to its upright normal use position, as shown in FIG. 1.

The actuator 140 and the lock assembly 120 can be configured such that when the seat back 14 is pivoted upward and the seat 10 is slid rearwardly to its normal use position, the actuator 140 actuates the lock assembly 120 so that the catch 122 reengages with the slots 130. The lock assembly 120 may include a memory feature (not shown) which enables the lock assembly 120 to remember the position that the seat 10 was in when the easy entry feature is used so that the seat 10 is returned automatically to that specific seat position after being moved from the forward easy entry position. Alternatively, the lock assembly 120 may be configured such that when the seat 10 is slid rearwardly after the easy entry mode, the lock assembly 120 is actuated at a specific location to lock the seat 10 back to the same position after every easy entry mode regardless of the position that the seat 10 was in prior to engaging the easy entry mode.

To help prevent the seat 10 from moving once it is in the forward easy entry position after initiating an easy entry mode, the seat 10 preferably includes a detent mechanism, such as indicated generally at 150 in FIGS. 5 and 6. The detent mechanism 150 retains the seat 10 in its forward easy entry position. Once the passenger is seated in the second row seat, the detent mechanism 150 can be operated to release the seat 10 from its forward easy entry position so that the seat 10 can be slid back to one upright normal use positions. An advantage of the detent mechanism 150 is that that the seat 10 will generally not move from its forward easy entry position until it is desired to move the seat 10. If the seat 10 were mounted at an incline, for example, the detent mechanism 150 may prevent the seat 10 from moving backwards before the user wants to move the seat 10.

In the illustrated embodiment of the detent mechanism 150 shown in FIGS. 5 and 6, the detent mechanism 150 is defined as formations formed in the lower track 34 that interact with the rollers 40a to retain the rollers 40a from moving, thereby preventing the upper track 32 from moving relative to the lower track 34. More specifically, the lower track 34 includes one or more slots or holes 152 formed therein. The spacing between the holes 152 may be the same as the spacing between the associated ones of the plurality of rollers 40a. FIG. 5 illustrates a portion of the track assembly 30 when the seat 10 is not in the forward easy entry position. For example, the track assembly 30 may be in one of the plurality of upright positions set by the occupant of the seat 10. In this position, the rollers 40a are spaced from the holes 152. The rollers 40a are engaged with the engagement surfaces 64 and 88 of the upper and lower tracks 32 and 34, respectively. As shown in FIG. 5, the portions of the engagement surfaces 64 and 68 which are contacted by the rollers 40a are preferably continuous arcuate surfaces to permit smooth rolling when the seat is moved between its plurality of upright positions. However, when the seat 10 is moved to its forward dumped position, such as during an easy entry mode, the rollers 40a engage with the holes 152 of the detent mechanism 150, as shown in FIG. 6. Once seated, the holes 152 mechanically resist rotation of the rollers 40a along the length of the upper and lower tracks 32 and 34. Note that if multiple rollers 40a and holes 152 are used for the detent mechanism 150, the rollers 40a may move over one or more holes 152. Thus, the detent mechanism 150 may have more than one position. Alternatively, the rollers 40a and the holes 152 may be spaced such that each roller 40a will only engage with one corresponding hole 152.

The holes 152 may have a width W which is less than the diameter of the rollers 40a. This prevents the rollers 40a from falling therethrough, while permitting the rollers 40a to be retained within the holes 152. Note that the load acting on the upper track 32 from the weight of the seat 10 acts to push the rollers 40a downwardly into the holes 152. The rollers 40a and the holes 152 are preferably sized so that the seat 10 can be manually pushed or pulled by a user to unseat the rollers 40a from the holes 152, thereby permitting the upper track 32 to be freely moved in a rearward direction relative to the lower track 34. This unseating force slightly raises the rollers 40a from out of the respective holes 152 to a position such that the rollers 40a are on top of the engagement surface 88 of the lower track 34, as shown in FIG. 5. Thus, a user can simply push or pull on the seat 10 in a generally horizontally longitudinal direction to unseat the rollers 40a from the holes 152.

The dimensions of the rollers 40a and the holes 152, along with the weight of the seat 10, generally determine the force necessary to unseat the rollers 40a. Generally, the force required to unseat the rollers 40a will be reduced with a smaller width W of the hole 152 compared to the widths or diameters of the rollers 40a. The seat track assembly 30 may also include a stop (not shown) which prevents the upper track 32 from moving beyond a furthermost forward position and a furthermost rear position relative to the lower track 34. The stop can be any suitable mechanism or feature, such as an interference (not shown) formed in the upper and/or lower tracks 32 and 34 that prevents the further relative movement of the upper and lower tracks 32 and 34.

It should be understood that the fit and assembly of the upper and lower tracks 32 and 34 and the rollers 40a, 42a, 44a, and 46a may be sized to accommodate clearance between these components. Thus, the seat track assembly 30 may have some "play" to accommodate vertical and lateral movement between the upper track 32, lower track 34, and the rollers 40a, 42a, 44a, and 46a. Thus, FIG. 4 schematically illustrates the generally placement of the rollers 40a, 42a, 44a, and 46a relative to their respective engagement surfaces. This clearance or "play" permits the rollers 40a, 42a, 44a, and 46a to be seated and unseated from the holes 152 even when a generally vertical load or force is applied to the seat track assembly 30.

It should be understood that the detent mechanism 150 may be placed anywhere along the length of the upper and lower tracks 32 and 34 so that the seat 10 may be retained in a desired position. For seats 10 having easy entry features, it may be desirable to locate the detent mechanism 150 such that the rollers 40a are retained when the seat 10 is in its furthermost forward position. However, the forward easy entry position may not necessarily be the furthermost possible forward position of the seat 10 relative to the vehicle floor 18. The seat track assembly 30 may also include a stop (not shown) which prevents the upper track 32 from moving beyond the furthermost possible forward position and/or the forward easy entry position.

An advantage of the use of the detent mechanism 150 over conventional seats that they use separate locking mechanisms to maintain the seat 10 in its forward easy entry position is that the user need not activate a release handle or switch but simply instead moves the seat rearwardly. The detent mechanism 150 simply temporarily retains the seat 10 in a forward easy entry position until a user moves the seat 10. The detent mechanism 150 also provides a relatively low cost in the manufacture and assembly cost of the seat 10 compared to conventional seats with separate easy entry locking mechanisms. Although the seat 10 has been described to be in a forward and dumped position as shown in FIG. 5, it should be understood that the seat back 14 does not necessarily have to be pivoted forward to a position above the seat bottom 12 as shown in FIG. 2, but may simply remain in its upright position. An advantage of the seat back 14 being moved to its forward position is that more space is generated to permit the passenger to move through the door opening of the vehicle.

Although FIGS. 5 and 6 illustrate three rollers 40a seating in three holes 152, it should be understood that any number of holes 152 may be used for seating any suitable number of rollers 40a. It should also be understood that the detent mechanism 150 may be located at any suitable location along the length of the upper and lower tracks 32 and 34. The detent mechanism 150 may be used with just one row of rollers 40, 42, 44, or 46 or with any combination thereof. For example, holes (not shown) similar to the holes 152 can be formed in other portions of the lower track 34 to interact with the rollers 42a, 44a, and/or 46a. Alternatively, the holes 152 may be formed in the upper track 32 or in both the upper and lower tracks 32 and 34.

Although the detent mechanism 150 has been described above with respect to holes 152 formed through the lower track 24, it should be understood that other types of detent mechanisms may be employed. For example, there is schematically illustrated in FIG. 7 a second embodiment of a seat track assembly, indicated generally at 160, which may be mounted to the seat 10. The seat track assembly 160 includes an upper track 162 and a lower track 164. A plurality of rollers 166 are disposed between the upper and lower tracks 162 and 164. A detent mechanism, indicated generally at 170 interacts with the rollers 166 disposed between the upper and lower tracks 162 and 164. The detent mechanism 170 includes formations formed in the lower track 164 but in the form of depressions or raised portions 172. To retain the seat 10 in a forward easy entry position, one or more of the rollers 162 is trapped or prevented from longitudinal movement along an engagement surface 174 of the lower track 164. As with the holes 152 of the detent mechanism 150 described above, the raised portions 172 of the detent mechanism 170 resist rotation of the rollers 166 when trapped within the raised portions 172. The raised portions 172 can have any suitable profile or shape to retain or resist movement of the rollers 166 in the longitudinal direction. For example, the raised portions 172 may have abrupt or steep inclines or may include a more gradual incline. As shown in FIG. 7, each side of the raised portions 172 may have different incline profiles 174 and 176.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A seat track assembly comprising:
   a first track;
   a second track having a detent; and
   a roller engaging with said first and second tracks for facilitating axial movement of said first track relative to said second track,
   wherein when said first track and said second track are located relative to one another at a predetermined position, said roller engages with said detent such that said detent releasably retains the first and second tracks in the predetermined position and allows the first and second tracks to be moved from the predetermined position by manually pulling or pushing on one of the first and second tracks such that said roller is disengaged from the detent.

2. The assembly of claim 1, wherein said second track is formed from an elongated metal sheet.

3. The assembly of claim 1, wherein said detent is a hole formed in said second track.

4. The assembly of claim 1, wherein said detent is a raised portion formed in said second track.

5. The assembly of claim 1, wherein said detent is a depression formed in said second track.

6. The assembly of claim 1, wherein said roller is spherical.

7. The assembly of claim 1, wherein said roller is cylindrical.

8. The assembly of claim 1 further including a locking assembly to selectively lock the position of said first track relative to said second track.

9. The assembly of claim 8, wherein said locking assembly includes a catch that is movable to a locked position wherein said catch is disposed within one of a plurality of slots formed in one of said first and second tracks.

10. A seat assembly for mounting on a floor, said seat assembly comprising:
    a seat; and
    a track assembly mounted on said seat for movably mounting said seat relative to the floor, wherein said track assembly includes:
    a first track mounted on said seat;
    a second track adapted to be mounted on a floor and having a detent; and
    a roller engaging with said first and second tracks for facilitating movement of said first track relative to said second track;
    wherein when said first track and said second track are located relative to one another at a predetermined position, said roller engages with said detent such that said detent releasably retains the first and second tracks in the predetermined position and allows the first and second tracks to be moved from the predetermined position by manually pulling or pushing on one of the first and second tracks such that said roller is disengaged from the detent.

11. The assembly of claim 10, wherein said seat includes a seat back pivotally mounted on a seat bottom, and wherein said seat back is movable between an upright position and a lowered position above said seat bottom.

12. The assembly of claim 11, wherein said roller rolls along an engagement surface of said second track.

13. The assembly of claim 12, wherein said second track is formed from elongated stamped metal sheets and said engagement surface is defined by an elongated planar portion, and wherein said detent is formed in said engagement surface.

14. The assembly of claim 12, wherein said detent is a hole formed in said engagement surface.

15. The assembly of claim 12, wherein said detent is a raised portion formed in said engagement surface.

16. A seat track assembly comprising:
    a first track;
    a second track;
    a roller that is engaged with the first and second tracks for facilitating sliding movement of the first track relative to the second track; and
    a detent provided on one of the first and second tracks and that is engaged by the roller when the first and second tracks are located at a predetermined position relative to one another to releasably retain the first and second tracks in the predetermined position, wherein the detent allows the first and second tracks to be moved from the predetermined position by manually pulling or pushing on one of the first and second tracks such that the roller is disengaged from the detent.

17. The seat track assembly of claim 16 wherein the detent is one of a hole formed in or a raised portion provided on one of the first and second tracks that is engaged by the roller when the first and second tracks are located at the predetermined position.

* * * * *